United States Patent [19]

Becker

[11] 3,851,979

[45] Dec. 3, 1974

[54] CABLE AND HOSE CLAMP

[75] Inventor: William K. Becker, Portage, Mich.

[73] Assignee: Daniel Woodhead, Inc., Northbrook, Ill.

[22] Filed: Sept. 20, 1972

[21] Appl. No.: 290,759

[52] U.S. Cl.................. 403/76, 403/165, 403/115, 248/75, 248/62
[51] Int. Cl............................................. F16l 27/02
[58] Field of Search............. 403/72, 73, 74, 75, 76, 403/77, 78, 114, 115, 164; 24/135 R, 115 R, 279, 284; 248/51, 52, 58, 60, 73, 74 R, 62, 75; 285/197, 198, 199

[56] References Cited
UNITED STATES PATENTS

| | | | |
|---|---|---|---|
| 1,802,015 | 4/1931 | Hays et al. | 285/199 |
| 2,461,031 | 2/1949 | Brickman | 403/76 |
| 3,006,674 | 10/1961 | Becker | 287/92 |
| 3,143,367 | 8/1964 | MacDonnell | 248/75 |
| 3,329,455 | 7/1967 | Becker et al. | 403/78 |

Primary Examiner—James R. Boler
Assistant Examiner—Conrad L. Berman
Attorney, Agent, or Firm—Woodhams, Blanchard & Flynn

[57] ABSTRACT

A clamp structure for connecting an end of an elongated element, such as a cable, to a portion of a hose located between the ends thereof. The clamp structure includes a pair of arcuate members arranged to form an annulus and having a central opening therethrough of approximately the same diameter as the portion of the hose. The arcuate members are fixedly clamped together and to the hose by means of connecting screws. A ball-like swivel member is mounted on one of the arcuate members substantially midway between the ends thereof. The swivel member is movably retained within an opening formed in the arcuate member and is retained therein by an arcuate lip portion which is integral with the arcuate member and defines an internal spherical bearing surface for the swivel member. The lip portion defines an opening through which extends the one end of the cable. The end of the cable is provided with a head portion which is connected to the swivel member to permit swivelling movement of the cable end and of the swivel member relative to the annulus.

11 Claims, 6 Drawing Figures

PATENTED DEC 3 1974 3,851,979

CABLE AND HOSE CLAMP

FIELD OF THE INVENTION

This invention relates in general to a clamp structure and, more particularly, to a type thereof for effecting a swiveled connection of an elongated cable, such as the cable of a cord reel, to a hose so that the hose can be pivoted relative to said cable without causing the cable to be pinched, and the cable can rotate about its axis relative to said hose without being twisted.

BACKGROUND OF THE INVENTION

It has been necessary or desirable to connect cables to hoses for many years and for a variety of reasons. As one example, it is common practice to mount a spring-actuated reel on or within a gasoline pump and connect the cable of the reel to the hose so that the hose will be automatically urged to return to the pump housing when the use of the hose is completed. In other words, instead of retracting the hose into the pump housing after each use, the cable, only, is retracted into its housing and at least most of the hose is held off the ground by the cable, but on the outside of the pump housing.

Heretofore, it has been customary to secure the cable to the hose by a connector which is substantially rigid in construction and which, at best, swivels or pivots around only one axis. As a result, it is not unusual for the connector and/or hose to be positioned so that the cable and/or hose is pinched, or so that a severe twist is applied to the connector and thereby transmitted at least in part to the hose, thereby effecting a distortion of the hose. That is, because of the inflexibility in the construction of existing connectors, the force applied to the connector by the cable often twists or distorts the hose so that it is difficult to handle and is sometimes even damaged.

Attempts have also been made to use hose engaging clamps provided with a substantially universal swivel member mounted on the clamp for connecting one end of the cable thereto. However, most of these prior known structures have required a substantial number of parts and accordingly have been expensive to manufacture and assemble. Further, in most of these known structures, the swivel member has been located at the interface between two arcuate clamping sections which engage the hose. This thus makes assembly of the overall clamping structure to the hose extremely difficult since the swivel structure must be properly maintained between the clamping sections at the same time that the clamping sections are being clampingly engaged with the hose. Further, these known structures have not exhibited the strength and durability necessary to withstand the rough treatment and use encountered by the hose of a gasoline pump.

While one particular use of the invention has been discussed in the foregoing paragraphs, it will be apparent that other uses can and will be made thereof.

Accordingly, a primary object of this invention is the provision of an improved clamping device for effecting a universal connection between one end of an elongated element, such as a cable, and an intermediate point on another elongated element, such as a hose.

A further object of this invention is the provision of a universal connecting device, as aforesaid, which can be easily and quickly connected and disconnected between the cable and the hose, which is extremely simple to assemble and use, and which is extremely durable and sturdy in structure.

A still further object of this invention is the provision of a universal connector, as aforesaid, which includes a pair of separable, arcuate clamping members which form an annulus for permitting same to be disposed in clamping engagement with the hose, and a swivel member mounted entirely on one of the arcuate clamping members at a location between the ends thereof for permitting attachment to the end of a cable, whereby the universal connection between the hose and the cable possesses the structural simplicity, strength, durability and size necessary to permit efficient manufacture, assembly and long life.

Other objects and purposes of the invention will be apparent to persons familiar with this type of equipment upon reading the following specification and inspecting the accompanying drawings.

Figure 1:
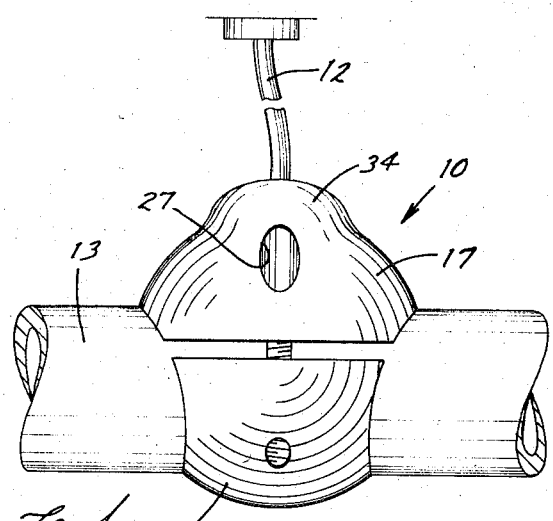
FIG. 1 is a side elevational view of the cable and hose clamp structure embodying the present invention.

Certain terminology will be used in the following description for convenience in reference only and will not be limiting. For example, the words "upwardly," "downwardly," "leftwardly" and "rightwardly" will refer to directions in the drawings to which reference is made. The words "inwardly" and "outwardly" will refer to the geometric center of the clamp structure and designated parts thereof. The term "axial" will generally be used with reference to a direction parallel to the elongated axis of the hose. Said terminology will include the words above specifically mentioned, derivatives thereof and words of similar import.

SUMMARY OF THE INVENTION

The objects and purposes of the invention, including those set forth above, have been met by providing a clamp structure which includes a pair of arcuate clamping members which form an annulus capable of being mounted on and snugly embracing a hose or similar object. The arcuate clamping members are fixedly connected and clamped on the hose by a pair of threaded connecting members, particularly screws. One of the arcuate clamping members is formed with a recess therein extending outwardly from the inner arcuate surface of the member, which recess extends radially through the arcuate member and has a reduced diameter opening formed at the radially outer end thereof. The opening is formed by an arcuate lip which is integral with the arcuate member. A ball-like swivel member is positioned within the recess and confined therein by the arcuate lip, which lip has an inner spherical bearing surface which rotatably supports the swivel member. One end of an elongated flexible element, particularly a cable, extends through the opening formed by the lip and is suitably anchored to the swivel member, thereby enabling a universal swiveling movement of the cable relative to the clamp structure and relative to the hose. The swivel member, when the clamp structure is mounted on the hose, is retained within the arcuate member by being confined between the hose and the lip. The complete clamp structure, particularly the arcuate clamping members and the swivel member, are preferably constructed of a rigid plastic material so as to be spark-proof.

DETAILED DESCRIPTION

The clamp structure 10 which has been selected to illustrate the present invention includes an annulus 11 for connecting one end of an elongated flexible element, such as a cable 12, to an object such as a hose 13. For purposes of illustration, the hose 13 can be connected to a gasoline pump (not shown). However, it will be recognized that the clamp structure 10 may also be used on other objects.

More specifically, the clamp structure 10 comprises a pair of arcuate members 16 and 17 which, when assembled, define the annulus 11 which has a central opening 18 adapted to receive therein the hose 13. The wall defining the central opening 18 has a plurality of axially spaced and radially inwardly extending ribs 19 for securely gripping the surface of the hose 13 to prevent axial displacement of the hose with respect to the clamp structure 10.

Figure 3:
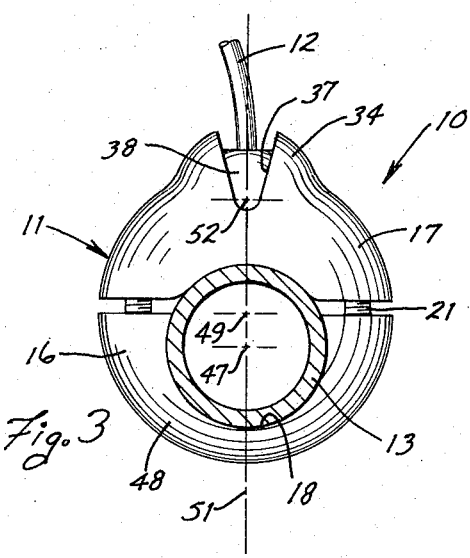
FIG. 3 is a side elevational view taken substantially along the line III—III in FIG. 2.
Figure 4:
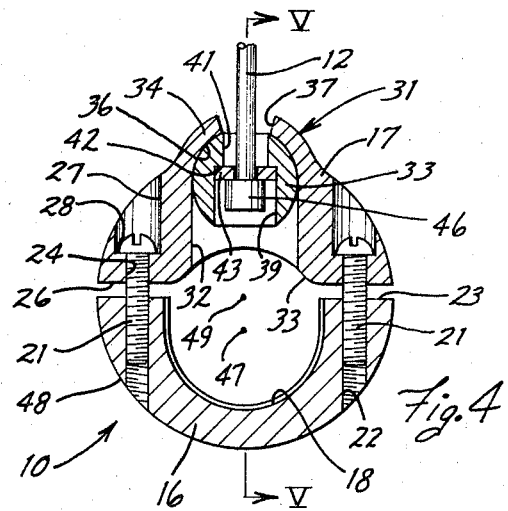
FIG. 4 is a sectional view taken substantially along the line IV—IV in FIG. 2, the hose being deleted for purposes of illustration.

The arcuate members 16 and 17 approximate semicircular members but, as illustrated in FIGS. 3 and 4, are preferably of slightly different angular extent. Specifically, the arcuate member 16 extends through an angle slightly greater than 180° (such as approximately 210°), whereas the arcuate member 17 extends through an angle slightly less than 180° (such as approximately 150°). The arcuate members 16 and 17 are fixedly interconnected in clamping engagement on the hose 13 by a pair of threaded connecting screws 21 which are positioned on diametrically opposite sides of the hose 13 and coact between the adjacent opposed end faces of the clamping members 16 and 17. For this purpose, the arcuate clamping member 16 is provided with an internally threaded opening 22 formed therein in substantially perpendicular relationship to the end face 23. The other clamping member 17 is similar formed with an opening 24 therein in substantially perpendicular relationship to its respective end face 26, which opening 24 is adapted to be substantially aligned with the opening 22 when the arcuate clamping members are disposed in opposed relationship to one another. The opening 24 communicates with an enlarged countersunk recess 27 adapted to receive therein the enlarged head of the connecting screw 21, with the head of the connecting screw 21 being adapted to bear against the bottom wall 28 of the recess 27.

Figure 2:
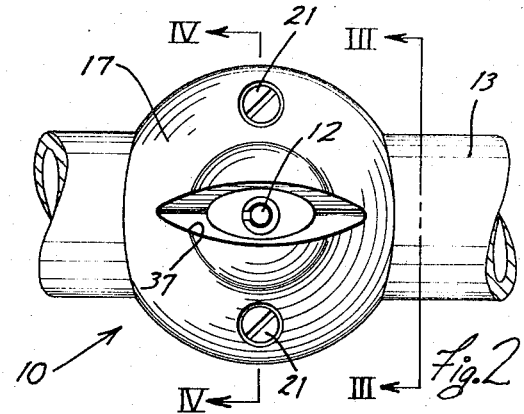
FIG. 2 is a top view of the structure illustrated in FIG. 1.
Figure 5:
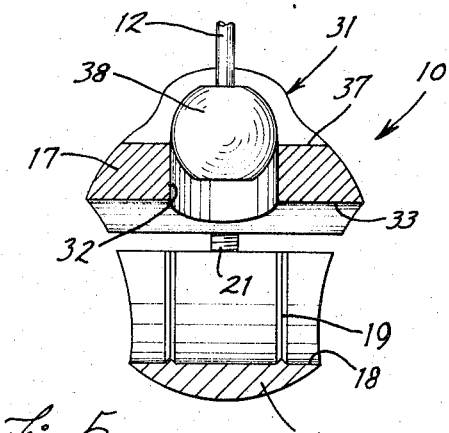
FIG. 5 is a sectional view taken substantially along the line V—V in FIG. 4.

The arcuate clamping member 17 is also provided with a suitable swivel structure 31 mounted thereon for permitting the end of the cable 12 to be pivotally interconnected to the annulus 11. For this purpose, the arcuate member 17 is provided with an enlarged opening 32 formed therein and extending substantially radially outwardly from the inner arcuate surface 33 thereof. The opening 32 is disposed substantially at the center or midpoint of the arcuate member 17 and extends radially outwardly in a direction substantially perpendicular to a plane defined by the end faces 26. The radially outer end of the opening 32 is partially closed by means of an annular lip portion 34 which is integrally connected to the arcuate member 17. The annular lip portion 34 defines an inner spherical bearing surface 36 which is a continuation of the internal cylindrical wall defining the opening 32. The lip portion 34 also defines an elongated slotlike opening 37 which diverges in the radially outward direction of the annulus 11. The opening 37 has a width substantially less than the diameter of the opening 32, and is elongated in the axial direction of the hose 13 as illustrated in FIGS. 2 and 5.

Figure 6:
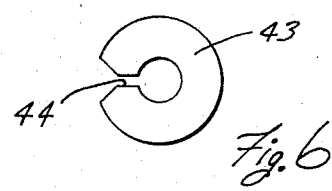
FIG. 6 is a plan view of the retainer member.

A ball-like swivel member 38 is positioned within the opening 32 and is rotatably supported on the inner spherical bearing surface 36 as formed by the lip portion 34. The swivel member 38, which has a diameter slightly less than the diameter of the opening 32, has a stepped bore extending diametrically therethrough which includes a large diameter bore 39 and a small diameter bore 41 defining a shoulder 42 at the interface thereof. The coaxially aligned bores 39 and 41 receive therein the free end of the cable 12, which end is provided with a ringlike retainer 43 thereon. The cable 12 has an enlarged swivel head 46 on the free end thereof whereby the retainer 43 seats against the shoulder 42 and prevents the swivel head from being withdrawn from the swivel member 38. The retainer 43, as illustrated in FIG. 6, has a radial slit 44 to enable same to be circumferentially expanded to a sufficient extent to enable the cable 12 to be passed through the slit into the central opening of the retainer after the swivel head 46 has been inserted through the stepped bore formed in the swivel member 38.

The arcuate clamping members 16, 17 and the swivel ball 38 are preferably constructed of a hard plastic material so that the exposed surfaces of the clamping structure 10 are spark-proof and resistant to corrosion. Further, by constructing the arcuate member 17 and the swivel ball 38 from the hard plastic member, there is provided a minimum of frictional resistance to movement of the swivel ball 38 relative to the arcuate member 17, and at the same time there is provided a very low rate of wear between the coacting surfaces thereof. The above-mentioned members may desirably be made of a hard plastic material having anti-friction properties such as nylon or Teflon (polytetrafluoroethylene). The ring 43 is preferably made of metal.

Before considering the operation of the clamp structure constructed according to the present invention, it should be noted that the central opening 18 of the annulus 11 is generated about a first axis 47 which, as illustrated in FIGS. 3 and 4, is laterally spaced from and substantially parallel to a plane defined by the end faces 23 of the clamping member 18. Further, the annulus 11 has an outer surface 48 which, except for the lip portion 34, is substantially spherical and is generated substantially about a center of rotation 49 which is laterally spaced from the axis 47. In fact, the center of rotation 49 is preferably disposed substantially within the plane defined by the end faces 23. The spherical outer surface 48 results in the annulus 11 having a substantially circular profile when viewed within the central plane thereof as taken through the center of rotation 49, as illustrated in FIG. 4, which central plane is substantially perpendicular to the axis 47. As illustrated in FIG. 3, the radial line 51 which passes through the center of rotation 49 and also intersects the axis 47 in substantially perpendicular relationship thereto, also passes through the center of rotation 52 of the ball-like swivel member 38.

The structure as defined above, due to the manner in which the external and internal surfaces are generated about the axis 47 and center of rotation 49, respectively, result in the arcuate members having a desirable geometry for both enabling mounting of the swivel member 38 and also enabling secure connection of the arcuate members by the threaded connecting members. Particularly, the relationship of the axis 47 and center of rotation 49 results in the ends of the arcuate member 18 being enlarged so as to readily accommodate the threaded openings 22. This relationship also results in the center portion of the arcuate member 17 being of increased radial thickness to thus facilitate mounting of the swivel member 38.

OPERATION

The clamp structure 10 of the present invention can be easily assembled from its component parts, so that it appears substantially as shown in FIG. 3. This is accomplished by inserting the swivel head 46 of the cable 12 through the opening 37 and through the stepped bore formed in the swivel member 38. The ringlike retainer 43 is then elastically deformed to enable the cable 12 to be inserted through the slit 44 into the central opening of the retainer. The swivel head 46 and retainer 43 are then drawn into the large bore 41 until the retainer 43 seats against the shoulder 42. The swivel ball 38 is also positioned in the opening 32 so that the ball seats against the inner spherical bearing surface 36. The free end of the cable 12 is thus suitably anchored to the arcuate member 17 while at the same time the cable is free to undergo a universal swiveling motion as permitted by the ball 36 and as accommodated by the opening 37.

The arcuate clamping members 17 and 18 are then disposed on diametrically opposite sides of the hose 13 so that the end faces 23 and 26 are disposed directly opposite one another. The connecting screws 21 are then inserted through the openings 24 and are threadedly screwed into the openings 22 as formed in the arcuate member 18, the screws being suitable tightened until the internal ribs 19 grip the hose 13. In this manner, the complete clamp structure 10 is easily assembled and interconnected between the hose 13 and the cable 12. Further, the cable 12 is prevented from separating from the hose 13 since the free end of the cable is connected to the swivel ball 38, which in turn is confined between the annular lip portion 34 and the hose 13.

Since the swivel ball 38 can be freely pivotally moved on the inner bearing surface 36, and since the cable 12 is also freely rotatably supported in the swivel ball 38 and the retainer ring 43, the cable 12 can be rotated about its own axis and can be pivoted in a universal manner substantially about the center of the swivel ball 38. Accordingly, binding and/or crimping of the cable 12 or twisting of the hose 13 during normal operation and use of the hose is avoided.

The exposed surfaces of the combined clamping members 17 and 18 intentionally and substantially form a sphere which minimizes obstruction by the clamping structure to movement thereof with the hose 13 around projections, such as trim and corners, on a vehicle being serviced. Moreover, the spherical shape and plastic outer surface also avoid damage, such as scratching, of the finish on said vehicle.

Where the cable 12 is made from a highly flexible element, such as nylon, the ring 43 can be omitted. That is, a knot is tied in the end of the nylon cord and seated in the large bore 39.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A clamping structure for effecting a universal connection between a cable and a hose, said structure comprising:

first and second arcuate clamping members which, when positioned adjacent one another in opposed relationship, define an annulus for encircling and clampingly engaging said hose, said annulus defining a central opening adapted to receive said hose;

one of said arcuate clamping members having a substantially radially extending opening formed therein substantially midway between the ends thereof, said one clamping member also having annular lip means fixed thereon and partially closing the radially outer end of said radially extending opening, said annular lip means having a radially inner wall defining a partial spherical bearing surface;

threaded connecting means for fixedly connecting said first and second clamping members in encircling and clamping engagement with said hose; and swivel means mounted solely on said one clamping member for connection to an end of said cable for enabling universal swivelling movement of said cable relative to said annulus, said swivel means including a ball-like swivel member movably supported solely on said one clamping member, said ball-like swivel member being disposed within said radially extending opening and positioned in bearing engagement with the partial spherical bearing surface defined by said annular lip means, and means for connecting said one end of said cable to said ball-like swivel member.

2. A clamp structure according to claim 1, wherein said annular lip means defines a slotlike opening aligned with and in communication with said radially extending opening, and said end of said cable being adapted to extend through said slotlike opening.

3. A clamp structure according to claim 1, wherein said threaded connecting means includes a pair of elongated threaded fastener members extending between and fixedly interconnected to said first and second arcuate clamping members, said pair of threaded fastener members being disposed on substantially diametrically opposite sides of said hose, said pair of threaded fastener members also being disposed on substantially opposite sides of said ball-like swivel member.

4. A clamp structure according to claim 3, wherein said ball-like swivel member has a stepped bore formed therethrough defining an internal shoulder, a cable having an enlarged head portion secured to an end thereof, said head portion being passed through the stepped bore in said swivel member, and said means for connecting said cable to said swivel member comprising retaining means coacting between the head portion of said cable and said shoulder of said swivel member for interconnecting said cable to said swivel member.

5. A clamp structure according to claim 4, wherein said retaining means includes a ringlike retainer member positioned on said cable adjacent the head portion thereof and disposed within the larger portion of said stepped bore, and said swivel member permitting said one end of said cable to freely rotate relative to said swivel member about the longitudinally extending axis of said cable.

6. A clamp structure according to claim 1, wherein one of said arcuate clamping members extends through an angle slightly in excess of 180° relative to the axis of said hose, and wherein said second clamping member extends through an angle slightly less than 180° relative to the axis of said hose, and said first and second clamping members each having a pair of substantially coplanar end faces separated and interconnected by an intermediate arcuate surface which defines a portion of the central opening of said annulus, the planar end faces of said first and second clamping members being disposed directly opposite and in substantially parallel relationship to one another when said clamping members are positioned in surrounding relationship to said hose, said second arcuate member having said radially extending opening formed therein and extending radially outwardly thereof from the intermediate arcuate surface.

7. A clamp structure according to claim 6, wherein each of said first and second arcuate clamping members each have an internal arcuate clamping surface, which surfaces coact to define a central opening adapted to receive therein said hose when said clamping members are interconnected to form said annulus in surrounding relationship to said hose, said central opening being generated about an axis;

said annulus having a substantially spherical outer surface profile generated about a point of rotation which is spaced from said axis, the center of rotation of said ball-like swivel member being positioned substantially on a radially directed line passing through said axis and said point of rotation, and said point of rotation being disposed between said axis and said center of rotation.

8. A clamp structure according to claim 7, wherein said threaded connecting means includes a pair of threaded fastening members extending between and fixedly interconnected to said first and second arcuate clamping members, said pair of threaded fastener members being disposed on substantially diametrically opposite sides of said hose, each of said threaded fastener members extending between a pair of opposed planar end faces as formed on said first and second clamping members.

9. A clamp structure according to claim 1, wherein said first and second arcuate clamping members each have an internal arcuate clamping surface, which surfaces coact to define said central opening to receive therein said hose when said clamping members are interconnected to form said annulus in surrounding relationship to said hose, said central opening being generated about an axis;

said annulus having a substantially spherical outer surface profile generated about a point of rotation which is spaced from said axis, the center of rotation of said ball-like swivel member being positioned substantially on a radially directed line passing through said axis and said point of rotation, and said point of rotation being disposed between said axis and said center of rotation.

10. A clamp structure according to claim 1, wherein the radially inner end of said radially extending opening communicates with said central opening, and the annular lip means comprising an annular lip portion integral with said one clamping member for partially closing the radially outer end of said radially extending opening, whereby said ball-like swivel member can be inserted into said radially extending opening only through the radially inner end thereof.

11. A clamp structure according to claim 10, wherein said threaded connecting means includes a pair of threaded fastening members extending between and fixedly interconnecting said first and second arcuate clamping members, said pair of threaded fastener members being disposed on substantially diametrically opposite sides of said hose, said pair of threaded fastener members also being disposed on substantially diametrically opposite sides of said ball-like swivel member.

* * * * *